United States Patent
Ahmavaara et al.

(10) Patent No.: US 8,483,174 B2
(45) Date of Patent: Jul. 9, 2013

(54) METHOD AND APPARATUS FOR PROVIDING GATEWAY RELOCATION

(75) Inventors: Kalle I. Ahmavaara, San Diego, CA (US); Georgios Tsirtsis, London (GB)

(73) Assignee: Qualcomm Incorporated, San Diego, CA (US)

(*) Notice: Subject to any disclaimer, the term of this patent is extended or adjusted under 35 U.S.C. 154(b) by 747 days.

(21) Appl. No.: 12/103,411

(22) Filed: Apr. 15, 2008

(65) Prior Publication Data
US 2008/0259873 A1 Oct. 23, 2008

Related U.S. Application Data

(60) Provisional application No. 60/913,239, filed on Apr. 20, 2007.

(51) Int. Cl.
*H04W 4/00* (2009.01)
(52) U.S. Cl.
USPC .......................................... 370/331
(58) Field of Classification Search
USPC ........... 370/203, 310, 329–349, 395.1, 395.2, 370/395.3, 395.4, 395.52, 395.54, 400–411, 370/431–448, 464–479
See application file for complete search history.

(56) References Cited

U.S. PATENT DOCUMENTS

| 2004/0058678 | A1* | 3/2004 | deTorbal .................... 455/437 |
| 2006/0203776 | A1* | 9/2006 | Persaud et al. ............. 370/331 |
| 2007/0253359 | A1* | 11/2007 | Hall et al. .................... 370/328 |
| 2007/0281699 | A1 | 12/2007 | Rasanen |
| 2008/0089293 | A1* | 4/2008 | Madour et al. ............. 370/331 |
| 2008/0159310 | A1 | 7/2008 | Senga et al. |
| 2008/0254768 | A1* | 10/2008 | Faccin ........................ 455/411 |
| 2008/0259873 | A1* | 10/2008 | Ahmavaara et al. ........ 370/331 |

FOREIGN PATENT DOCUMENTS

| JP | 2005079804 A | 3/2005 |
| JP | 2006203641 A | 8/2006 |
| WO | WO2007029977 A1 | 3/2007 |

OTHER PUBLICATIONS

International Search Report—PCT/US08/060849—International Search Authority, European Patent Office—Oct. 10, 2008.
Written Opinion—PCT/US08/060749—International Search Authority, European Patent Office—Oct. 10, 2008.
Nguyen-Vuong Q., et al., "An Architecture for UMTS-WIMAX Interworking," Proceedings of the 1st International Workshop on Bradband Convergence Networks (BCN), Apr. 7, 2006, pp. 1-10.
Zhao X., et al., "Flexible Network Support for Mobile Hosts," ACM Mobile Networks and Applications, vol. 6, No. 2, Mar. 1, 2001, pp. 137-149.
3rd Generation Partnership Project, "3GPP System Architecture Evolution: GPRS enhancements for E-UTRAN access; Release 8," Technical Specification Group Services and System Aspects; 3GPP TS 23.401, Apr. 16, 2007.

(Continued)

*Primary Examiner* — Jung-Jen Liu
(74) *Attorney, Agent, or Firm* — Kam T. Tam

(57) ABSTRACT

An apparatus and method for providing gateway relocation to an external network wherein a user equipment (UE) includes an initial external network connection via a source core node, comprises initializing a mobility event, reallocating the initial external network connection from via the source core node to via a target core node to create a new external network connection, allocating the new IP address to the UE for the new external network connection, and using the new IP address.

107 Claims, 14 Drawing Sheets

OTHER PUBLICATIONS

Siemens AG, et al., "Solution to roaming with local breakout," IP.com Journal, IP.com Inc., West Henrietta, NY, Oct. 24, 2007.

Taiwan Search Report—TW097114376—TIPO—Aug. 15, 2011.

* cited by examiner

METHOD AND APPARATUS FOR PROVIDING GATEWAY RELOCATION

CLAIM OF PRIORITY UNDER 35 U.S.C. §119

The present application for patent claims priority to Provisional Application No. 60/913,239 entitled "Methods and Apparatus for Providing Gateway Relocation Procedures" filed Apr. 20, 2007, and assigned to the assignee hereof and hereby expressly incorporated by reference herein.

FIELD

This disclosure relates to apparatus and methods for providing gateway relocation.

BACKGROUND

In many wireless communications systems, for example cellular systems, the network architecture is hierarchical, with a layering of network nodes from the user to external networks. In such architectures, the user equipment (UE) typically accesses the wireless network through edge nodes, such as base stations. Next, the edge nodes communicate with intermediate nodes, such as a base station controller (BSC), serving GPRS support node (SGSN), radio network controller (RNC), or mobile management entity (MME), etc. The intermediate nodes communicate with core nodes, such as a gateway GPRS support node (GGSN) or packet data support node (PDSN). A core node provides a pathway to external networks, such as the Internet, the public switched telephony network (PSTN), etc. The top level core node in a wireless communication system is known as a gateway.

The UE is typically a mobile terminal which can communicate while in motion throughout a coverage area. The UE is at any one time typically associated with a particular edge node, intermediate node, and source core node. As the UE moves within the coverage area, it is typically reassigned to different edge nodes and intermediate nodes through a process known as relocation. While there are relocation procedures for edge and intermediate nodes, once the UE is associated with a particular source core node or gateway, it typically remains associated with that source core node or gateway until the end of the communications session. Conventionally, if the source core node needs to be changed for a UE from a current source core node to a target core node, the wireless system invokes an initial attach procedure with the target core node, where the association with the current source core node is not utilized.

SUMMARY

Disclosed is an apparatus and method for providing gateway relocation which takes advantage of the intermediate nodes, eliminates recreating the association between the UE and the target gateway from scratch, decreases potential service disruption during gateway relocation and promotes efficient association of the UE with the target gateway that is more optimal for the UE's current location.

According to one aspect, a method for providing gateway relocation to an external network wherein a user equipment (UE) includes at least one initial external network connection via a source core node, comprises initializing a mobility event, reallocating the at least one initial external network connection from via the source core node to via a first target core node to create at least one new external network connection, allocating at least one new IP address to the UE for the at least one new external network connection, and using the at least one new IP address.

According to another aspect, an apparatus for providing gateway relocation to an external network wherein a user equipment (UE) includes at least one initial external network connection via a source core node, the apparatus comprising at least one processor and at least one memory, the at least one memory containing program code executable by the at least one processor for performing the following: initializing a mobility event, reallocating the at least one initial external network connection from via the source core node to via a first target core node to create at least one new external network connection, allocating at least one new IP address to the UE for the at least one new external network connection, and using the at least one new IP address.

According to another aspect, an apparatus for providing gateway relocation to an external network wherein a user equipment (UE) includes at least one initial external network connection via a source core node, comprises means for initializing a mobility event, means for reallocating the at least one initial external network connection from via the source core node to via a first target core node to create at least one new external network connection, means for allocating at least one new IP address to the UE for the at least one new external network connection, and means for using the at least one new IP address.

According to another aspect, a computer-readable medium for providing gateway relocation to an external network wherein a user equipment (UE) includes at least one initial external network connection via a source core node, the computer-readable medium including program code thereon, which when executed by at least one computer implement a method comprising program code for initializing a mobility event, program code for reallocating the at least one initial external network connection from via the source core node to via a first target core node to create at least one new external network connection, program code for allocating at least one new IP address to the UE for the at least one new external network connection, and program code for using the at least one new IP address.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 1:
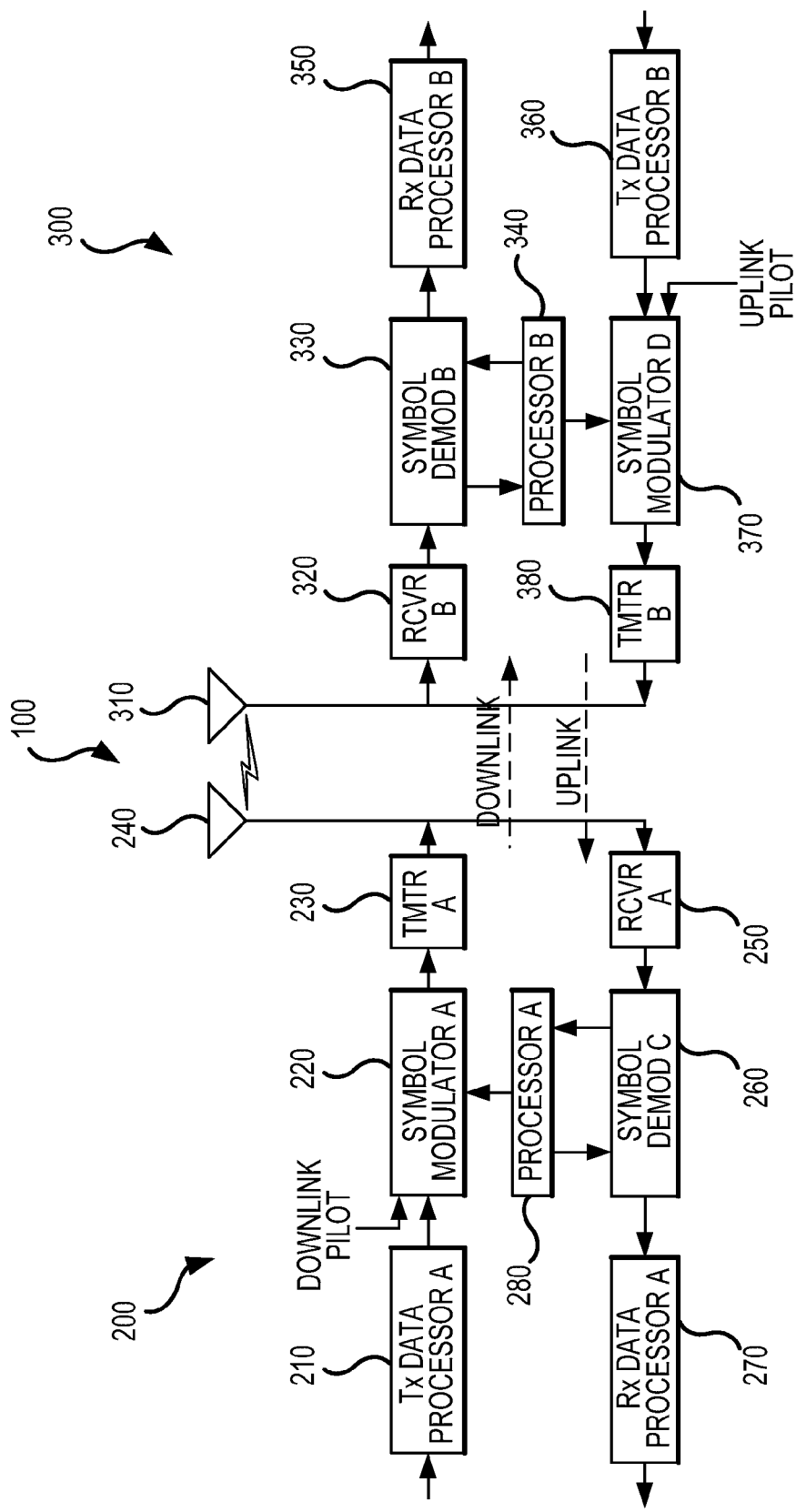
FIG. 1 illustrates an example of a wireless link.

FIG. 1 illustrates an example of a wireless link 100. One skilled in the art would understand that the wireless link 100 illustrated in FIG. 1 may be implemented in an FDMA environment, an OFDMA environment, a CDMA environment, a WCDMA environment, a TDMA environment, a SDMA environment or any other suitable wireless environment.

The wireless link 100 includes an access point 200 (e.g., edge node, base station, etc.) and a wireless communication device 300 (a.k.a. user equipment or UE). In the downlink leg, the access point 200 (e.g. edge node, base station, etc.) includes a transmit (TX) data processor A 210 that receives, formats, codes, interleaves and modulates (or symbol maps) traffic data and provides modulation symbols (a.k.a. data symbols). The TX data processor A 210 is in communication with a symbol modulator A 220. The symbol modulator A 220 receives and processes the data symbols and downlink pilot symbols and provides a stream of symbols. In one aspect, symbol modulator A 220 is in communication with processor A 280 which provides configuration information. Symbol modulator A 220 is in communication with a transmitter unit (TMTR) A 230. The symbol modulator A 220 multiplexes the data symbols and downlink pilot symbols and provides them to the transmitter unit A 230.

Each symbol to be transmitted may be a data symbol, a downlink pilot symbol or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In yet another aspect, the downlink pilot symbols are code division multiplexed (CDM). In one aspect, the transmitter unit A 230 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 240.

In the downlink leg, the wireless communication device 300 (a.k.a. UE) includes antenna 310 for receiving the analog downlink signal and inputting the analog downlink signal to a receiver unit (RCVR) B 320. In one aspect, the receiver unit B 320 conditions, for example, filters, amplifies and frequency downconverts the analog downlink signal to a "conditioned" signal. The "conditioned" signal is then sampled. The receiver unit B 320 is in communication with a symbol demodulator B 330. The symbol demodulator B 330 demodulates the "conditioned" and "sampled" signal (a.k.a. data symbols) outputted from the receiver unit B 320. The symbol demodulator B 330 is in communication with a processor B 340. Processor B 340 receives downlink pilot symbols from symbol demodulator B 330 and performs channel estimation on the downlink pilot symbols. In one aspect, the channel estimation is the process of characterizing the current propagation environment. The symbol demodulator B 330 receives a frequency response estimate for the downlink leg from processor B 340. The symbol demodulator B 330 performs data demodulation on the data symbols to obtain data symbol estimates. The data symbol estimates are estimates of the data symbols that were transmitted. The symbol demodulator B 330 is also in communication with a RX data processor B 350. The RX data processor B 350 receives the data symbol estimates from the symbol demodulator B 330 and, for example, demodulates (i.e., symbol demaps), interleaves and/or decodes the data symbol estimates to recover the traffic data. In one aspect, the processing by the symbol demodulator B 330 and the RX data processor B 350 is complementary to the processing by the symbol modulator A 220 and TX data processor A 210, respectively.

In the uplink leg, the wireless communication device 300 (a.k.a. UE) includes a TX data processor B 360. The TX data processor B 360 receives and processes traffic data to output data symbols. The TX data processor B 360 is in communication with a symbol modulator D 370. The symbol modulator D 370 receives and multiplexes the data symbols with uplink pilot symbols, performs modulation and provides a stream of symbols. In one aspect, symbol modulator D 370 is in communication with processor B 340 which provides configuration information. The symbol modulator D 370 is in communication with a transmitter unit B 380.

Each symbol to be transmitted may be a data symbol, an uplink pilot symbol or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In yet another aspect, the uplink pilot symbols are code division multiplexed (CDM). In one aspect, the transmitter unit B 380 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 310.

The analog uplink signal from wireless communication device (UE) 300 is received by antenna 240 and processed by a receiver unit A 250 to obtain samples. In one aspect, the receiver unit A 250 conditions, for example, filters, amplifies and frequency downconverts the analog uplink signal to a "conditioned" signal. The "conditioned" signal is then sampled. The receiver unit A 250 is in communication with a symbol demodulator C 260. The symbol demodulator C 260 performs data demodulation on the data symbols to obtain data symbol estimates and then provides the uplink pilot symbols and the data symbol estimates to the RX data processor A 270. The data symbol estimates are estimates of the data symbols that were transmitted. The RX data processor A 270 processes the data symbol estimates to recover the traffic data transmitted by the wireless communication device 300. The symbol demodulator C 260 is also in communication with processor A 280. Processor A 280 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 280 and processor B 340 direct (i.e., control, coordinate or manage, etc.) operation at the access point 200 (e.g. edge node, base station, etc.) and at the wireless communication device 300 (a.k.a. user equipment or UE), respectively. In one aspect, either or both processor A 280 and processor B 340 are associated with one or more memory units (not shown) for storing of program codes and/or data. In one aspect, either or both processor A 280 or processor B 340 or both perform computations to derive frequency and impulse response estimates for the uplink leg and downlink leg, respectively.

In one aspect, the wireless link 100 is a multiple-access system. For a multiple-access system (e.g., FDMA, OFDMA, CDMA, TDMA, etc.), multiple terminals transmit concurrently on the uplink leg. In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

One skilled in the art would understand that the techniques described herein may be implemented by various ways. For example, the techniques may be implemented in hardware, software or a combination thereof. For example, for a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that performs the functions described therein. The software codes may be stored in memory units and executed by processor A 280 and processor B 340.

The various illustrative logical blocks, modules, and/or circuits described herein may be implemented or performed with one or more processor units (a.k.a. processor). A processor may be a general purpose processor, such as a microprocessor, a specific application processor, such a digital signal processor (DSP), or any other hardware platform capable of supporting software. Software shall be construed broadly to mean any combination of instructions, data structures, or program code, whether referred to as software, firmware, middleware, microcode, or any other terminology. Alternatively, a processor may be an application specific integrated circuit (ASIC), a programmable logic device (PLD), a field programmable gate array (FPGA), a controller, a micro-controller, a state machine, a combination of discrete hardware components, or any combination thereof. The various illustrative logical blocks, modules, and/or circuits described herein may also include computer readable medium for storing software. The computer readable medium may also include one or more storage devices, a transmission line, or a carrier wave that encodes a data signal.

Figure 2:
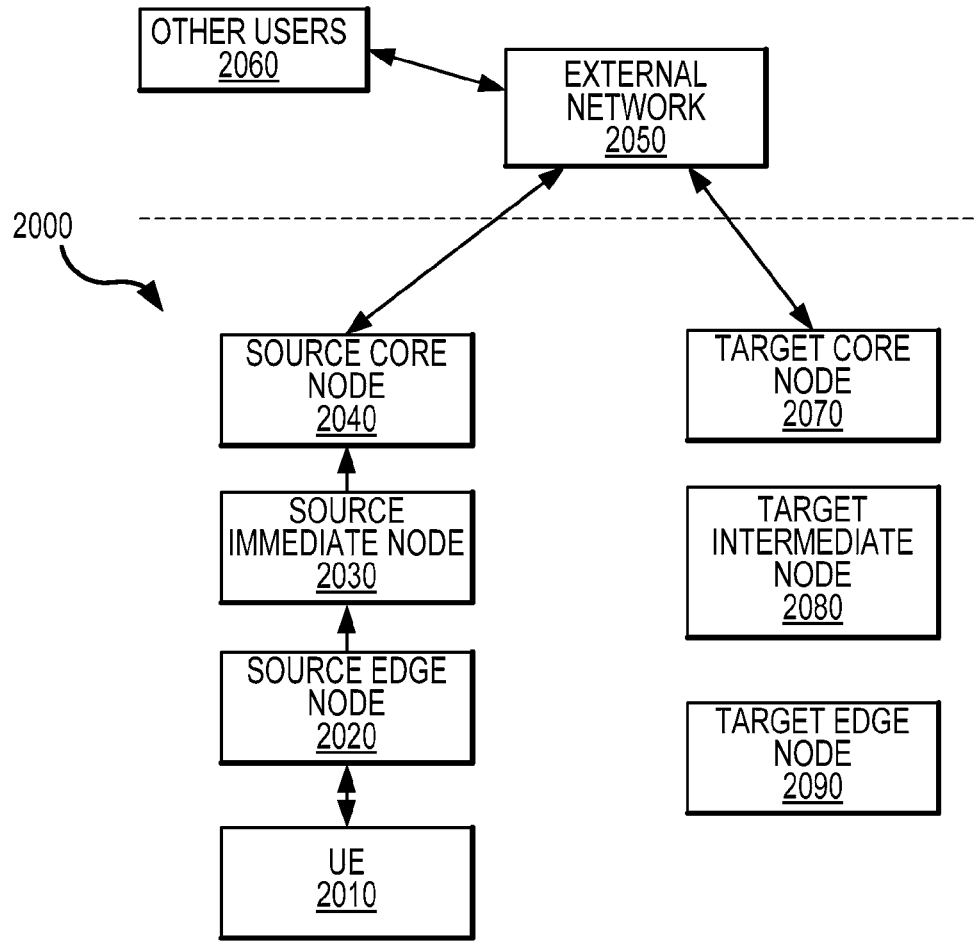
FIG. 2 illustrates an example of a hierarchical wireless communication system which accesses an external network.

FIG. 2 illustrates an example of a hierarchical wireless communication system 2000 which accesses an external network 2050. In one example, the external network 2050 is a Packet Data Network (PDN). The wireless communication system 2000 includes a user equipment (UE) 2010. In one example, the UE 2010 is a mobile terminal such as a cellular handset. The wireless communication system 2000 includes at least one source edge node 2020 which provides access to the UE 2010. In one example, the source edge node 2020 is a base station for a cellular system. The wireless communication system 2000 includes at least one source intermediate node 2030 to provide local network services to the source edge node 2020. In one example, the source intermediate node 2030 is a base station controller (BSC) for a cellular system. In one example, the source intermediate node 2030 is a serving GPRS support node (SGSN), radio network controller (RNC) or a mobile management entity (MME). The wireless communication system 2000 includes a source core node 2040 which provides access for the link of UE-source edge node-intermediate node to an external network 2050. In one example, the external network 2050 is the Internet or the public switched telephony network (PSTN), etc. In one aspect, the external network 2050 provides access to other users 2060. In one aspect, the wireless communication system 2000 includes a target edge node 2090 and a target intermediate node 2080. In one example, as the UE 2010 moves within a coverage area, a mobility event from the source core node 2040 to a target core node 2070 is desired. In one aspect, a mobility event is a gateway relocation. In another aspect, a mobility event is a hard handover combined with a gateway relocation. In one aspect, the source core node and the target core node are co-located.

In one aspect, an access system which provides access for the UE 2010 includes the source edge node 2020. In another aspect, the access system includes the source edge node 2020 and the source intermediate node 2030. One skilled in the art would understand that the characteristic of the access system can be based on various factors, such as but not limited to, system application, designer or user choice without affecting the spirit or scope of the disclosure. Relocation from the source core 2040 to a target core node 2070 may be initiated for various reasons. In one aspect, the access system is divided into zones, network or regions, etc., and as the UE 2010 moves between zones, network or regions, etc., relocation from the source core 2040 to a target core node 2070 is initiated. In one aspect, the UE 2010 initiates the relocation. In one example, the reason for relocation is based on observed network delays, number of handoffs, or distance traveled, etc. In one aspect, how the UE 2010 is registered with the external network 2050 determines whether relocation is or is not performed. In one example UE 2010 uses a type of identifier (e.g., Access Point Name (APN), Network Access Identifier (NAI), etc.) to identify the type of external network 2050 to connect to (e.g., local operator, remote operator, Mobile Virtual Network (MVN), Virtual Private Network (VPN), etc.). In one example the identifier include information regarding the desirability of IP address preservation during mobility events or the desirability of gateway relocation where the IP address may not be preserved. For example, a fixed local breakout APN type 1 indicates fixed.local.breakout@domain to point to a local breakout that is not relocated when the UE 2010 moves (i.e., the IP address of the local breakout remains fixed). Also, for example, a moving local breakout APN type 2 indicates moving.local.breakout@domain to point to a local breakout that can be relocated when the UE 2010 moves (i.e., the IP address of the local breakout can change). In one example, other APN types are based on the type of IP connectivity required (e.g., IPv6, IPv4, etc.). One skilled in the art would understand that additional APN types can be defined without affecting the spirit or scope of the disclosure. In one example, the target core node is a PDNGW (Packet Data Network Gateway) and the moving local breakout is a moving local breakout PDN (Packet Data Network) connection. In one aspect, the target core node allocates the new IP address after completion of the hard handover.

Figure 3:
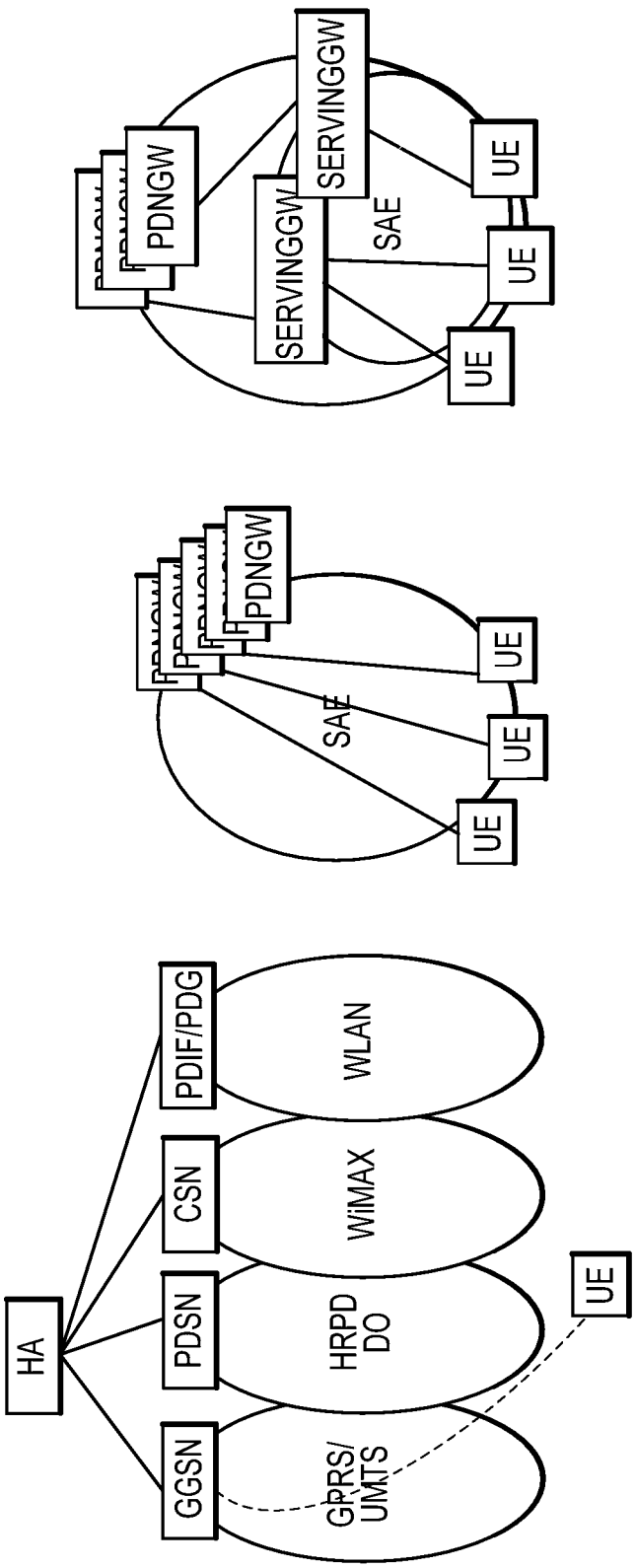
FIGS. 3a, 3b, and 3c illustrate three examples of wireless communication systems with different gateway architectures.

FIGS. 3*a*, 3*b* and 3*c* illustrate three examples (3*a*, 3*b*, 3*c*) of wireless communication systems with different gateway architectures. In the example shown in FIG. 3*a*, the UE accesses the Internet via one of four access systems, e.g., GPRS/UMTS, HRPD (High Rate Packet Data) DO (Data Optimization), WiMAX and WLAN. Respectively for each of the four access systems the source core node (a.k.a. gateway) are GGSN, PDSN (Packet Data Serving Node), CSN (Connectivity Service Network) and PDIF/PDG where PDIF is defined as Packet Data Interworking Function and PDG is defined as Packet Data Gateway. The Mobile IP (or Proxy Mobile IP) can be overlayed over the four access systems so that movement between these four access systems is made seamless to the UE. One skilled in the art would understand that the quantity and specific access systems could vary without affecting the spirit or scope of the disclosure.

In the example shown in FIG. 3*b*, multiple source core nodes (a.k.a. gateways) of the same type are used. In one example, the multiple source core nodes are multiple instances of Packet Data Network Gateway (PDNGW). In this example the access system is a System Architecture Evolution (SAE). One skilled in the art would understand that other source core nodes and associated access system can be used without affecting the spirit or scope of the disclosure. For example, the multiple source core nodes are GGSNs and the associated access system is UMTS.

In example shown in FIG. 3*c*, a hierarchy of multiple source core nodes (a.k.a. gateways) is used. The hierarchy includes a lower layer of serving gateways and a higher layer of gateways. In one example, the higher layer of gateways are multiple PDNGWs and the access system is SAE. In one aspect, the serving gateways provide local anchoring to the UEs which are connected to the higher layer of gateways. The interface between the serving gateways and the higher layer of gateways may be within the same wireless communication system or within different wireless communication systems.

Figure 4:
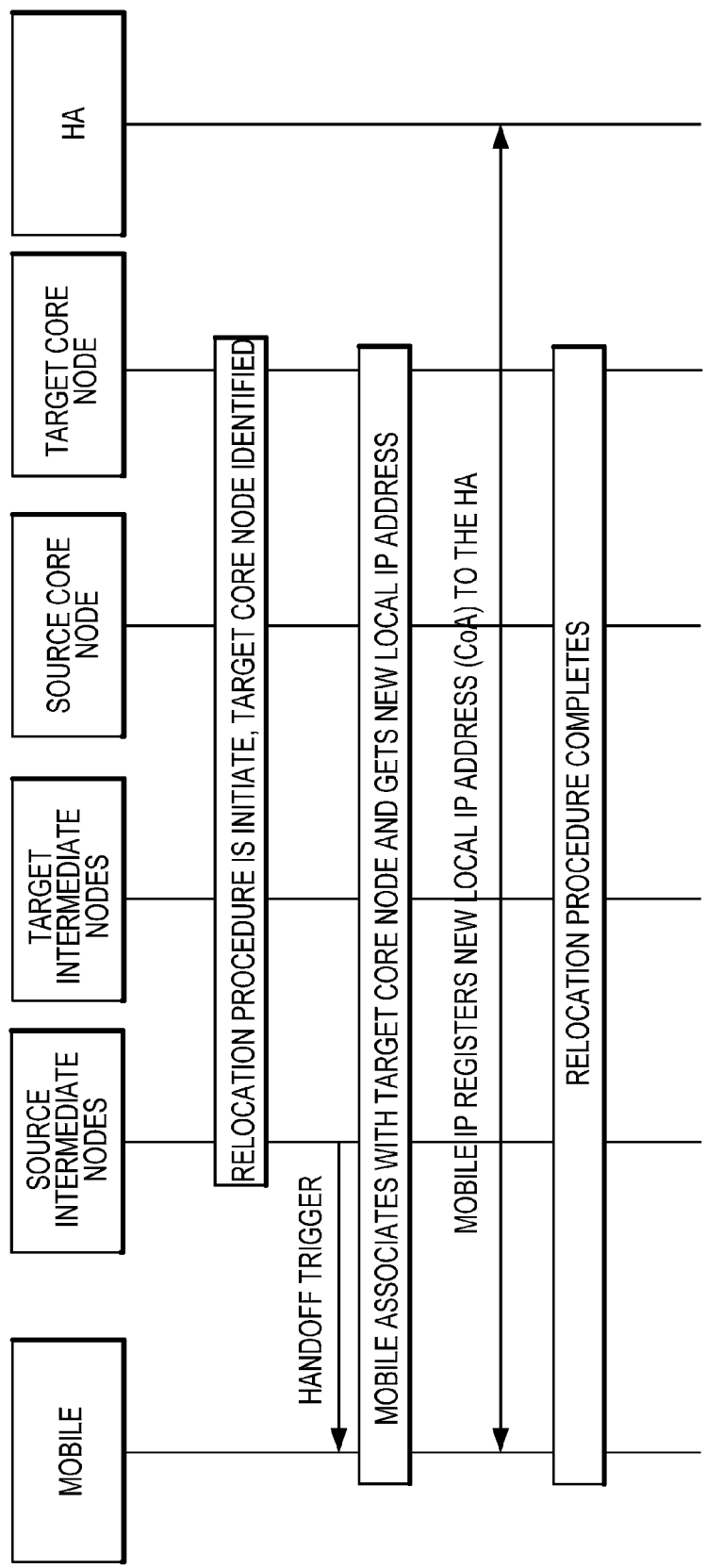
FIG. 4 illustrates an example of a gateway relocation procedure.

FIG. 4 illustrates an example of a gateway relocation procedure. The gateway relocation procedure illustrated in FIG. 4 utilizes the source intermediate node 2030 and the source core node 2040 to enable a new association with the target core node 2070. In one example, the source core node 2040 is no longer optimal for the UE 2010 and the following steps are taken:

1) Initiate gateway relocation procedure and identify the target core node. In one example, the intermediate node initiates the gateway relocation procedure. In one example, the intermediate node identifies the target core node.
2) The UE is notified of the handoff.
3) The UE is associated with the target core node, and the target core node allocates a new IP address to the UE.
4) The UE registers the new IP address with its home agent (HA) to maintain communication. In one aspect, the UE registers the new IP address with a core node wherein the home agent is one example of the core node. In another aspect, the core node is a PDNGW.
5) The gateway relocation procedure is completed.

Figure 5A:
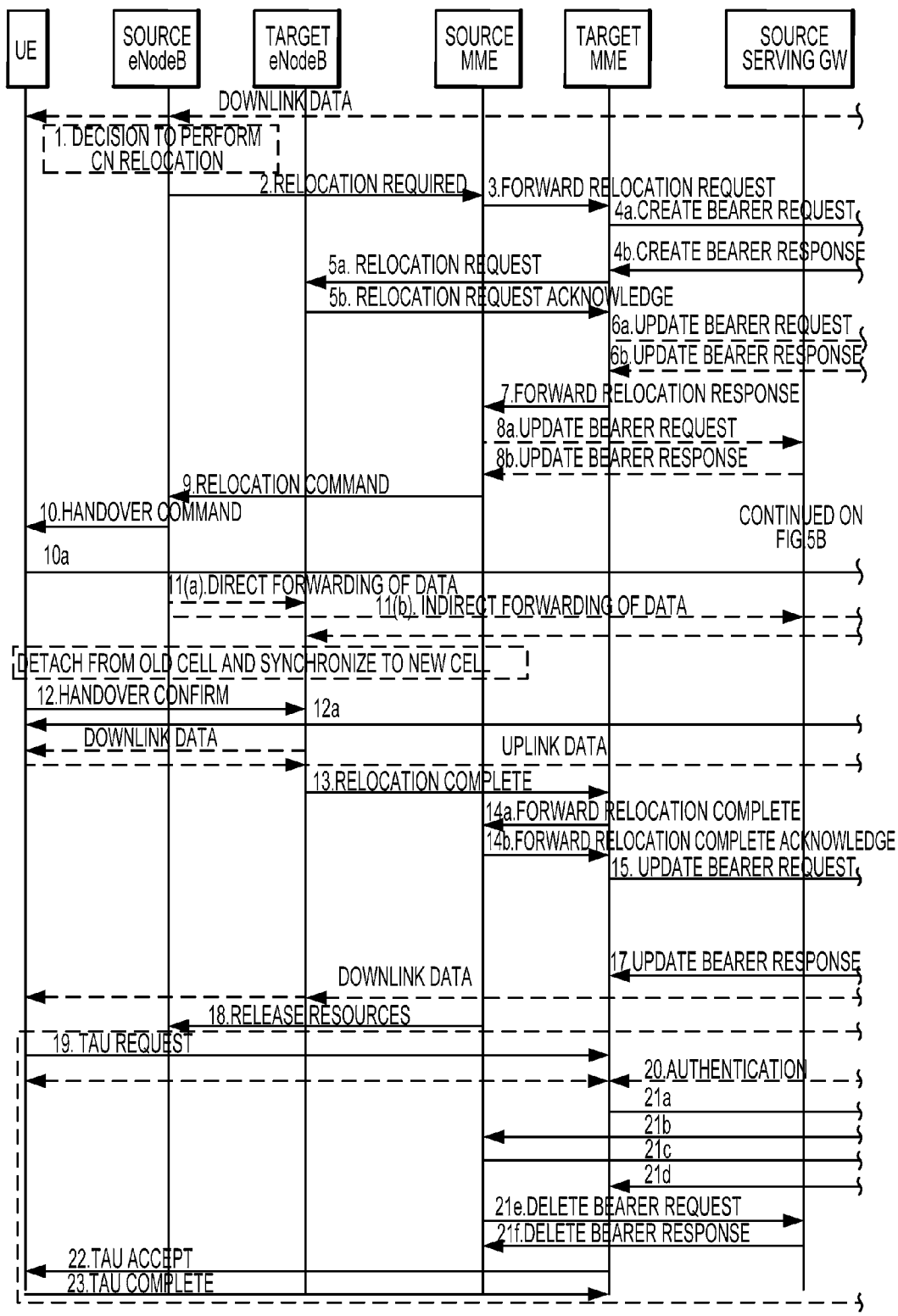
FIGS. 5a and 5b illustrate an example of a gateway relocation procedure for supporting reallocation of a gateway node during Active Mode relocation procedure.
Figure 5B:
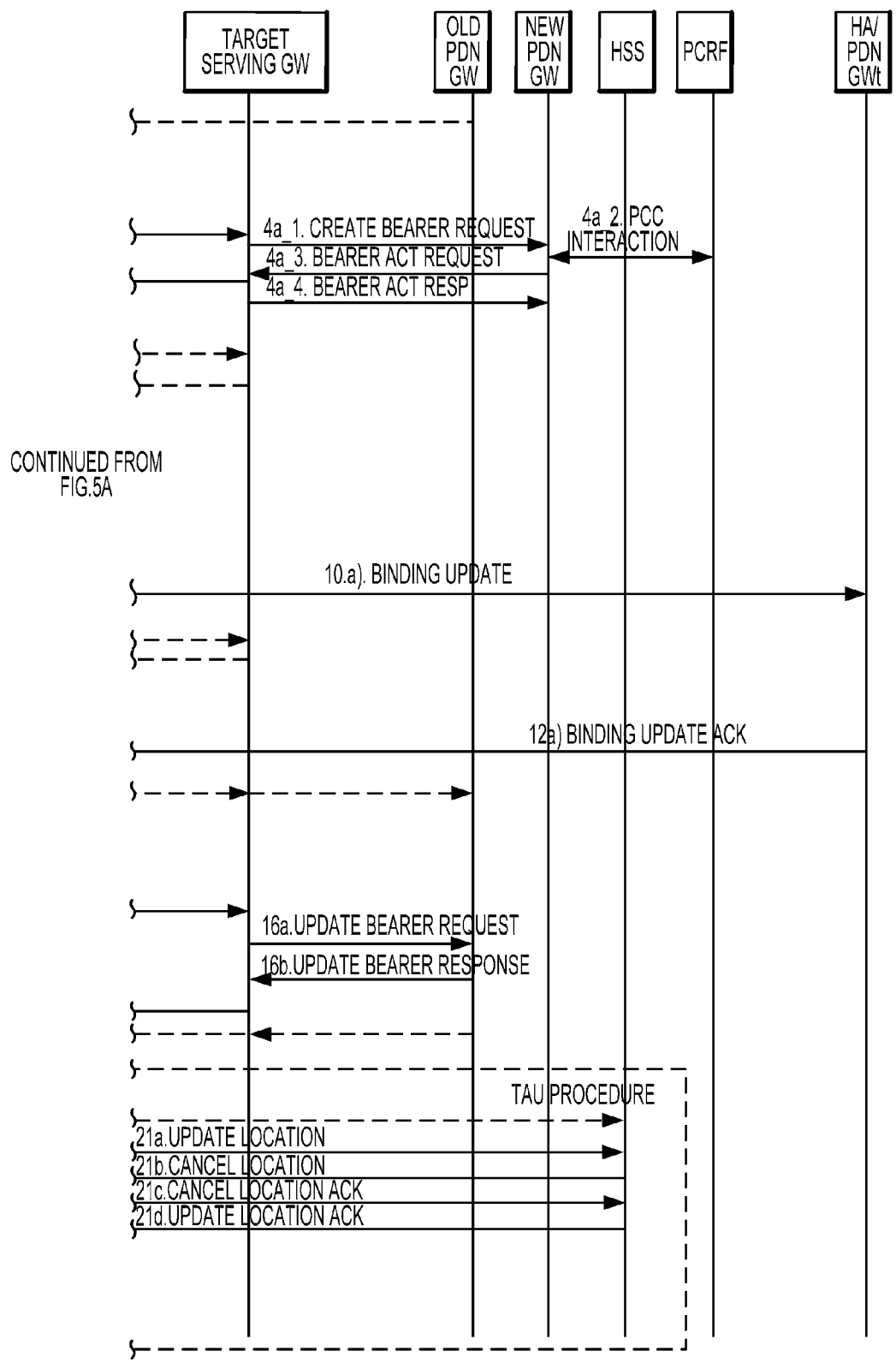

FIGS. 5*a* and 5*b* illustrate an example of a gateway relocation procedure for supporting reallocation of a gateway node during Active Mode relocation procedure In FIGS. 5*a* and 5*b*, the Source eNodeB is an example of the source edge node 2020 (shown in FIG. 2), the Target eNodeB is an example of the target edge node 2090 (shown in FIG. 2), the Source MME is an example of the source intermediate node 2030 (shown in FIG. 2), the Target MME is an example of the target intermediate node 2080 (shown in FIG. 2). In one aspect, the Source Serving gateway and old PDNGW are examples of the source core node 2040 (shown in FIG. 2), and the Target Serving gateway and new PDNGW are examples of the target core node 2070 (shown in FIG. 2).

The gateway relocation procedure illustrated in FIGS. 5*a* and 5*b* utilizes the source MME, the target MME, the source serving gateway and the target serving gateway to enable a new association with the new PDNGW. In one example, the old PDNGW is no longer optimal for the UE and the following steps are taken:

1) The source eNodeB decides to perform a handover to the target eNodeB. This can be triggered e.g. by no X2 connectivity to the target eNodeB, or by configuration in the source eNodeB showing that the target eNodeB does not have S1_MME connectivity to the source MME, or by an error indication from the target eNodeB after an unsuccessful X2-based handover.
2) The source eNodeB sends Relocation Required to the source MME.
3) The source MME selects the target MME and sends a Forward Relocation Request message to it, which includes the UE context in the source MME.
4) The target MME decides whether to change the Serving GW and selects a target Serving GW. The target MME sends a Create Bearer Request message to the target Serving GW, including information about the established bearers of the UE and identity of the PDNGW and its TEIDs (Tunnel Endpoint Identifier).
   Message 4a also includes the list of "local breakout bearers" [list of {APN or/and New PDNGW address, Label, QoS info, . . . }] for which the PDNGW should be reallocated during the relocation.

For these "local breakout bearers" target Serving GW contacts the new PDNGW to request bearer activation by sending Create Bearer Request [4a_1] [list of {APN, label, QoS info}]. PDNGW allocates the PDN address(es) to be used for the requested bearers.

The new PDNGW may request authorization from Policy and Charging Rule Function (PCRF) for the new bearers [4a_2] [list of {APN, label, QoS info}].

If authorized, PDNGW sends Bearer Activation Request [4a_3] to target Serving GW [list of {bearer ID, TEIDs at PDNGW, label. QoS info, PDN address(es)}] and target Serving GW maps the new S5/S8 bearers with the existing bearers towards UE.

Target Serving GW responds to New PDNGW with Bearer Activation Response [4a_4] [list of {TEID at target serving GW}] (one per bearer).

Note: Typically the new PDNGW is collocated with the target Serving GW.

The target Serving GW allocates TEIDs for the uplink traffic on S1_U reference point (one TEID per bearer). The target Serving GW sends an acknowledgement message back to the target MME, which include these newly allocated TEIDs.

5) The target MME sends Relocation Request message to the target eNodeB. This message creates the UE context in the target eNodeB, including information about the bearers, and the security context. The target eNodeB sends a Relocation Request Acknowledge message to the MME. This includes the TEIDs allocated at the target eNodeB for downlink traffic on S1_U reference point (one TEID per bearer).

6) If indirect forwarding is used, the target MME sets up forwarding parameters in the target Serving GW.

7) The target MME sends a Forward Relocation Response message to the source MME. This message carries also the new PDN address(es) for the "local breakout bearers" for which the PDNGW was reallocated in step 4.

8) If indirect forwarding is used, the source MME updates the source Serving GW about the tunnels used to the target Serving GW.

9) The source MME sends a Relocation Command message to the source eNodeB. This message carries also the new PDN address(es) for the "local breakout bearers" for which the PDNGW was reallocated in step 4.

10) The Handover Command is sent to the UE. This message carries also the new PDN address(es) for the "local breakout bearers" for which the PDNGW was reallocated in step 4.

The UE must be made aware that a CN relocation is being performed, since it will have to perform a Tracking Area Update (see below). The UE detaches from the old cell and synchronizes to the new cell.

10a) To ensure service continuity for services using Mobile IP the UE may send Binding Update towards the Home Agent (HA) and inform the newly allocated CoA (care of address which is a temporary IP address for the UE) to the HA. Note that this message 10a) can alternatively be sent after the radio handover before or after step 12.

11) The source eNodeB may start forwarding of downlink data from the source eNodeB to the target eNodeB. This may be either direct or indirect forwarding.

12) After the UE has successfully synchronized to the target cell, it sends a Handover Confirm message to the target eNodeB. Downlink packets forwarded from the source eNodeB can be sent to the UE. Also, uplink packets can be sent from the UE, which are forwarded to the target Serving GW and the PDNGW.

12a) Home Agent responds to Binding Update. UE receives the Binding Update after the radio handover via the new radio link. The Binding Acknowledgement may alternatively be sent already earlier before the radio HO has occurred.

Note: another alternative is for the Binding Acknowledgement to be sent to both the old and the new local breakout addresses (i.e., bicasted). This was the UE will received either on the old link or on the new link depending on the timing of step 12.

13) The target eNodeB sends a Relocation Complete message to the target MME.

14) The target MME sends a Forward Relocation Complete to the source MME. The source MME in response sends a Forward Relocation Complete Acknowledge to the target MME.

15) The target MME sends an Update Bearer Request to the target Serving GW. This includes the TEIDs allocated at the target eNodeB for downlink traffic.

16) The target Serving GW assigns TEIDs (one per bearer) for downlink traffic from the PDNGW. It sends an Update Bearer Request to the PDNGW, including the assigned TEIDs. The PDNGW starts sending downlink packets to the target Serving GW using the newly received TEIDs. These downlink packets will use the new downlink path via the target Serving GW and target eNodeB. An Update Bearer Response is sent back to the target Serving GW.

17) The target Serving GW sends an Update Bearer Response to the target MME.

18) After the source MME has received the Forward Relocation Complete message, it sends a Release Resources message to the source eNodeB. The source eNodeB can the release resources in the source eNodeB. The timing of this message and the timing of releasing the resources are FFS.

19) As soon as the handover to the target eNodeB is completed, the UE sends a Tracking Area Update Request message, which arrives to the target MME.

20) The target MME may optionally authenticate the UE 21)
a) The target MME updates the HSS by sending an Update Location message
b) The HSS sends a Cancel Location message to the source MME.
c) The source MME sends a Cancel Location Ack message to the HSS.
d) After the HSS has received the Cancel Location Ack message, it sends an Update Location Ack to the target MME.
e) The source MME releases the bearer in the source Serving GW by sending a Delete Bearer Request message.
f) The source Serving GW sends a Delete Bearer Response to the source MME.

22) The target MME sends a Tracking Area Update Accept to the UE, which include a new S-TMSI allocated by the target MME.

23) The UE acknowledges the new S-TMSI by sending a Tracking Area Update Complete message.

Figure 6:
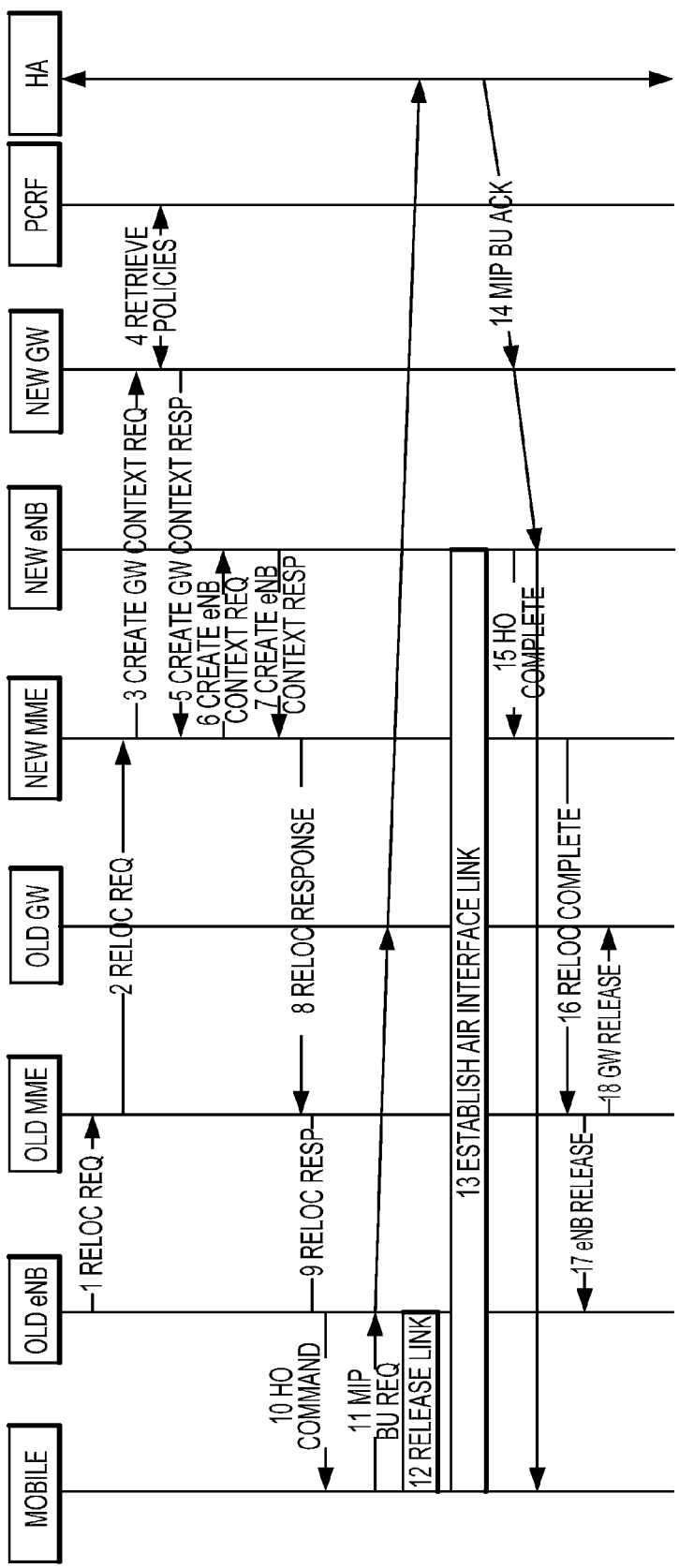
FIG. 6 illustrates an example of a gateway relocation procedure within a 3GPP system with IP allocation embedded in L2 signaling.

FIG. 6 illustrates an example of a gateway relocation procedure within a 3GPP system with IP allocation embedded in layer 2 (L2) signaling. In one aspect, the intermediate nodes (including Old eNB and old MME) decide that relocation of the gateway would be beneficial and initiate the process using Reloc Req signal (e.g., steps 1-8 shown in FIG. 6). The new gateway is assigned and context is provided to the new gateway and other supporting nodes (e.g., new MME). In one aspect, the new IP address (CoA) for the UE is allocated by the new gateway (e.g., after step 3). In one aspect, the new IP address (CoA) is conveyed to the UE by steps 5, 8, 9, 10 shown in FIG. 6. In one aspect, after step 10 shown in FIG. 6, the UE sends BU (binding update) Req with new CoA to HA (home agent), releases old air link and tunes to the new air link. The local breakout switches from the old gateway to the new gateway.

Figure 7:
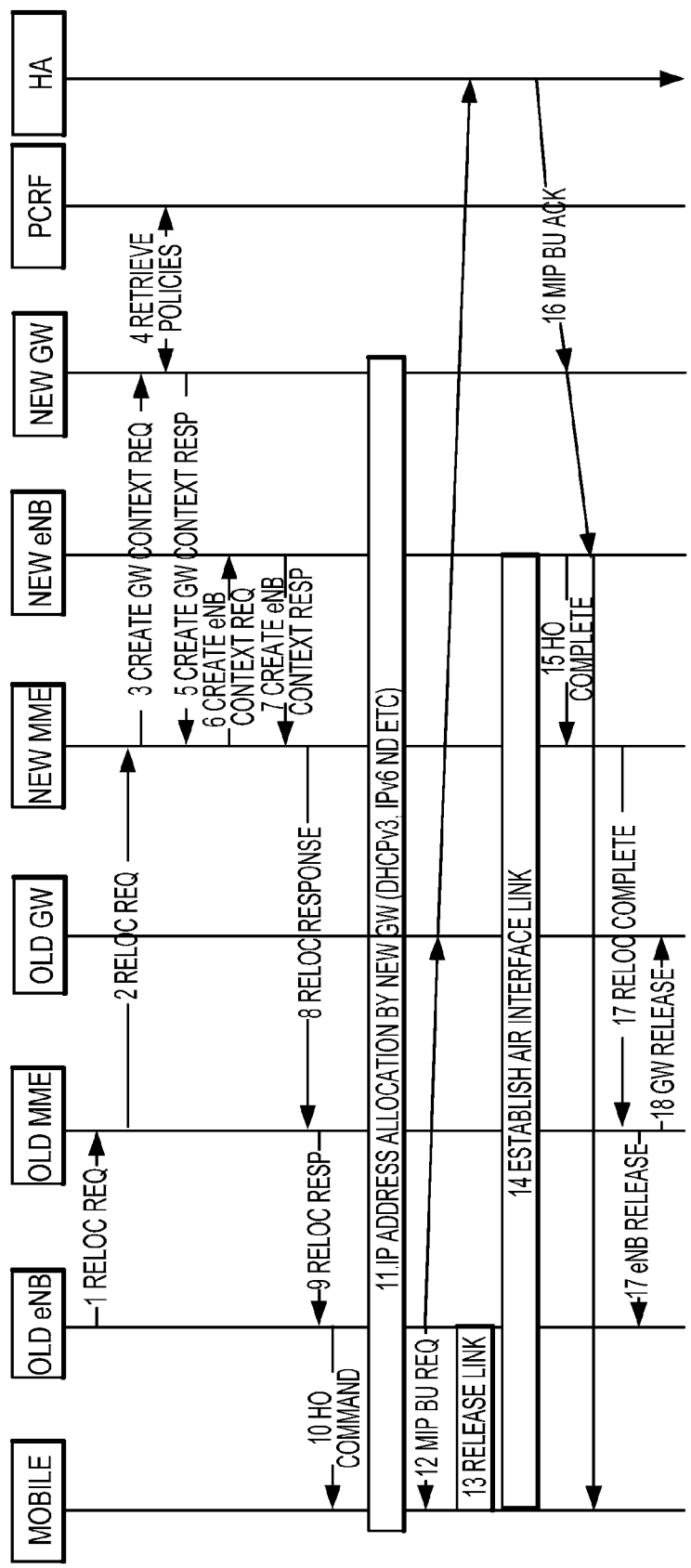
FIG. 7 illustrates an example of a gateway relocation procedure within a 3GPP system with IP address allocation done with IP layer signaling.

FIG. 7 illustrates an example of a gateway relocation procedure within a 3GPP system with IP address allocation done with IP layer signaling. FIG. 7 illustrate a different time address allocation procedure from that shown in FIG. 6. In one aspect, the new IP address (CoA) for the UE is allocated by the new gateway and conveyed to the UE (e.g., in step 11 of FIG. 7) using standard IP allocation mechanisms. In one aspect, after step 12 shown in FIG. 7, the UE sends BU Req with new CoA to HA (home agent), releases the old air link and tunes to the new air link. In another aspect, the MIP BU is sent after step 14 shown in FIG. 7.

Figure 8:
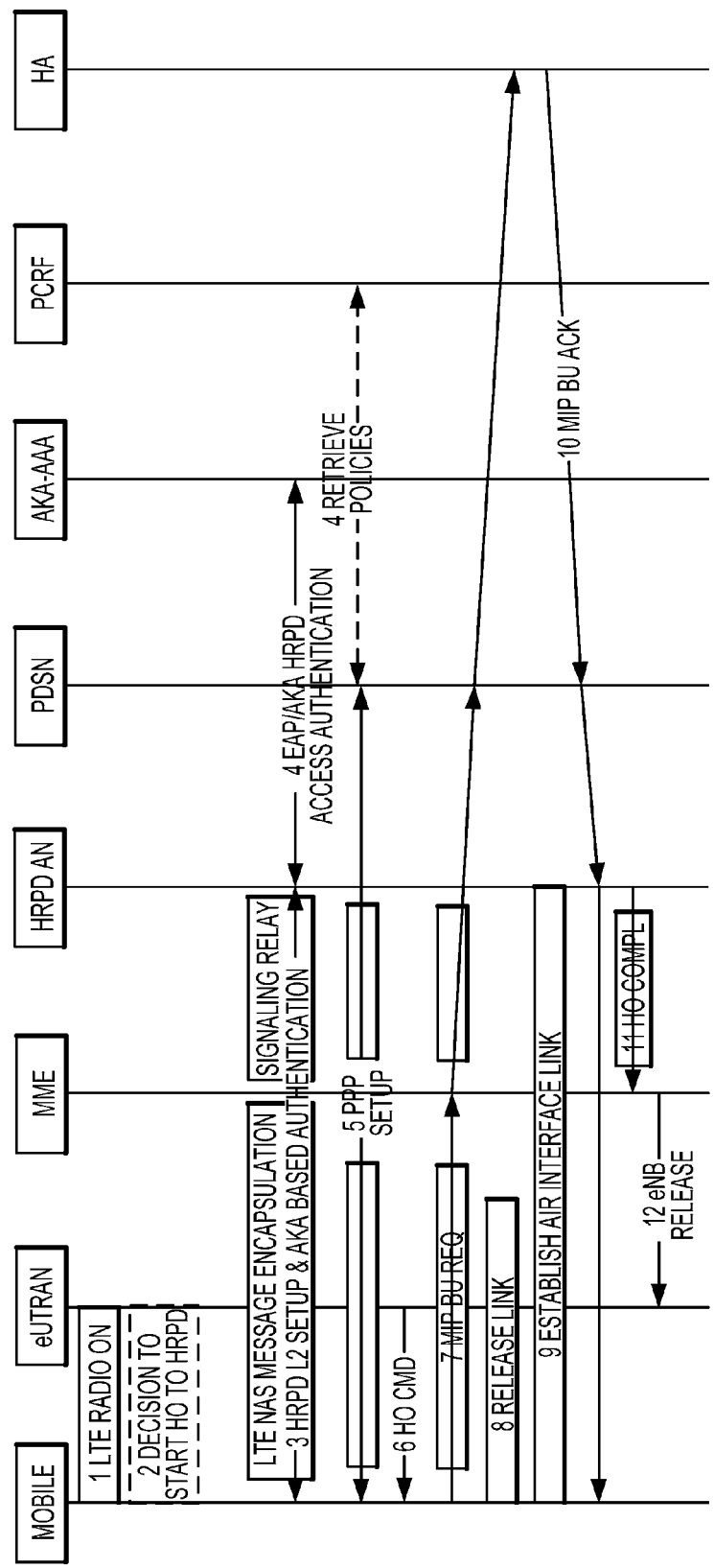
FIG. 8 illustrates an example of a gateway relocation procedure from a 3GPP system to a 3GPP2 HRPD system.

FIG. 8 illustrates an example of a gateway relocation procedure from a 3GPP system to a 3GPP2 HRPD system. In one aspect, the UE is relocated between gateways of different wireless systems (e.g., from SAE to HRPD). In one aspect, the intermediate nodes in SAE (e.g., eUTRAN and MME) allow the UE to first authenticate with AKA-AAA (Authentication & Key Agreement Protocol-Authentication and Authorization, e.g., steps 3, 4 shown in FIG. 8), and then to set up PPP (Point-to-Point Protocol) connection with the target gateway (e.g., PDSN), and to be allocated an IP address (e.g., step 5 shown in FIG. 8). The UE then registers the Mobile IP. In one aspect, the new IP address (CoA) for the UE is allocated by PDSN (e.g., step 5 shown in FIG. 8). In one example, after step 6 shown in FIG. 8, the UE sends BU Req with new CoA to HA (home agent), releases old LTE air link, and tunes to the new HRPD air link. The local breakout switches from the old SAE gateway (not shown) to the target PDSN.

Figure 9:
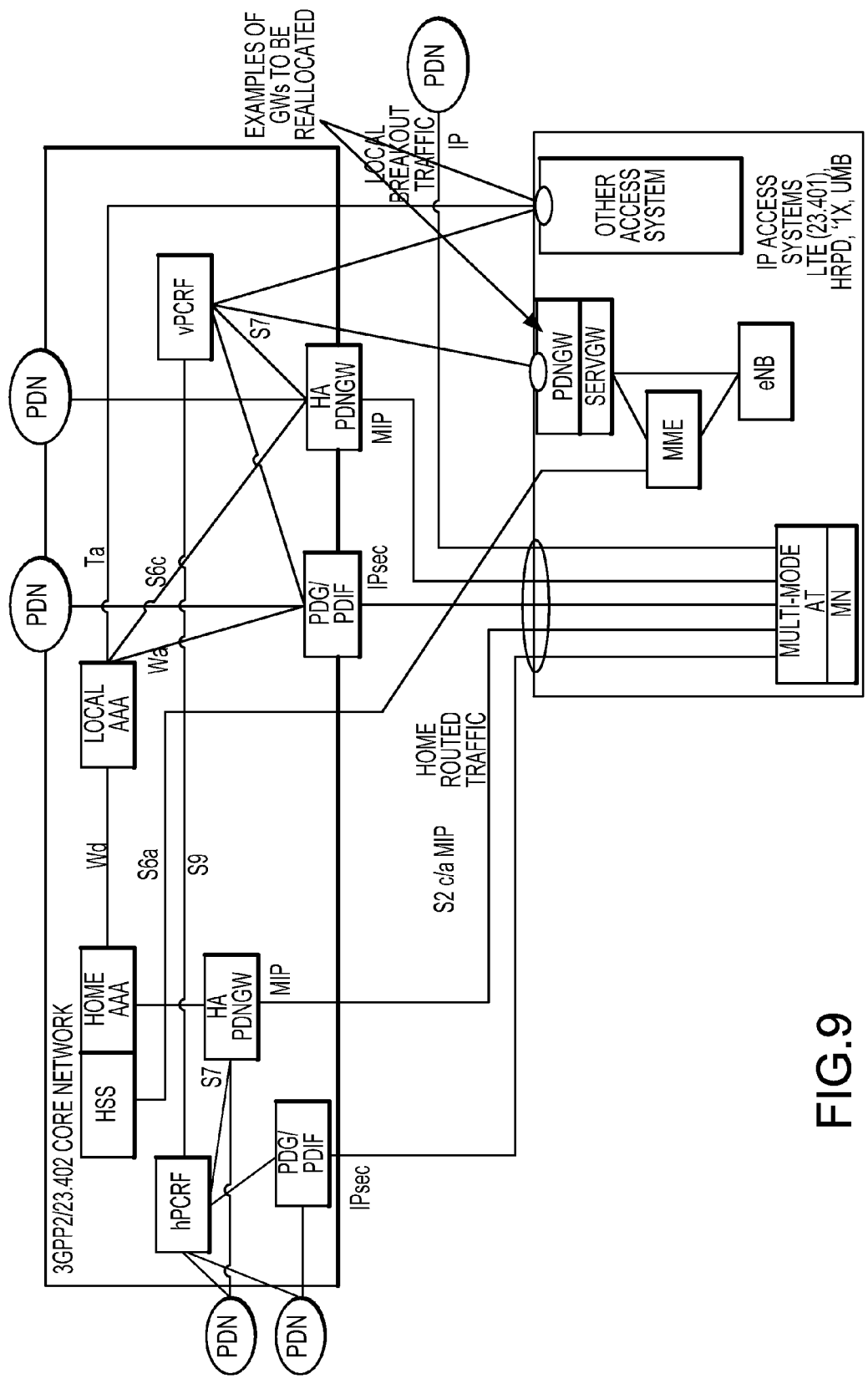
FIG. 9 illustrates a first example of a wireless communication system architecture indicating examples of gateways to be relocated.

FIG. 9 illustrates a first example of a wireless communication system architecture indicating examples of gateways to be relocated. FIG. 9 shows possible types of IP based connections. In one aspect, although possible, not all the IP based connections are used simultaneously. In one aspect, there exists IP based tunneling (IPsec/MIP). As examples, the IP access systems shown are LTE access and other access. In one aspect, each IP connection is via any IP access system. In one aspect, all IP connections can use mobility within the connected IP access system. In one aspect, MIP based IP connections can use mobility between access systems.

Figure 10:
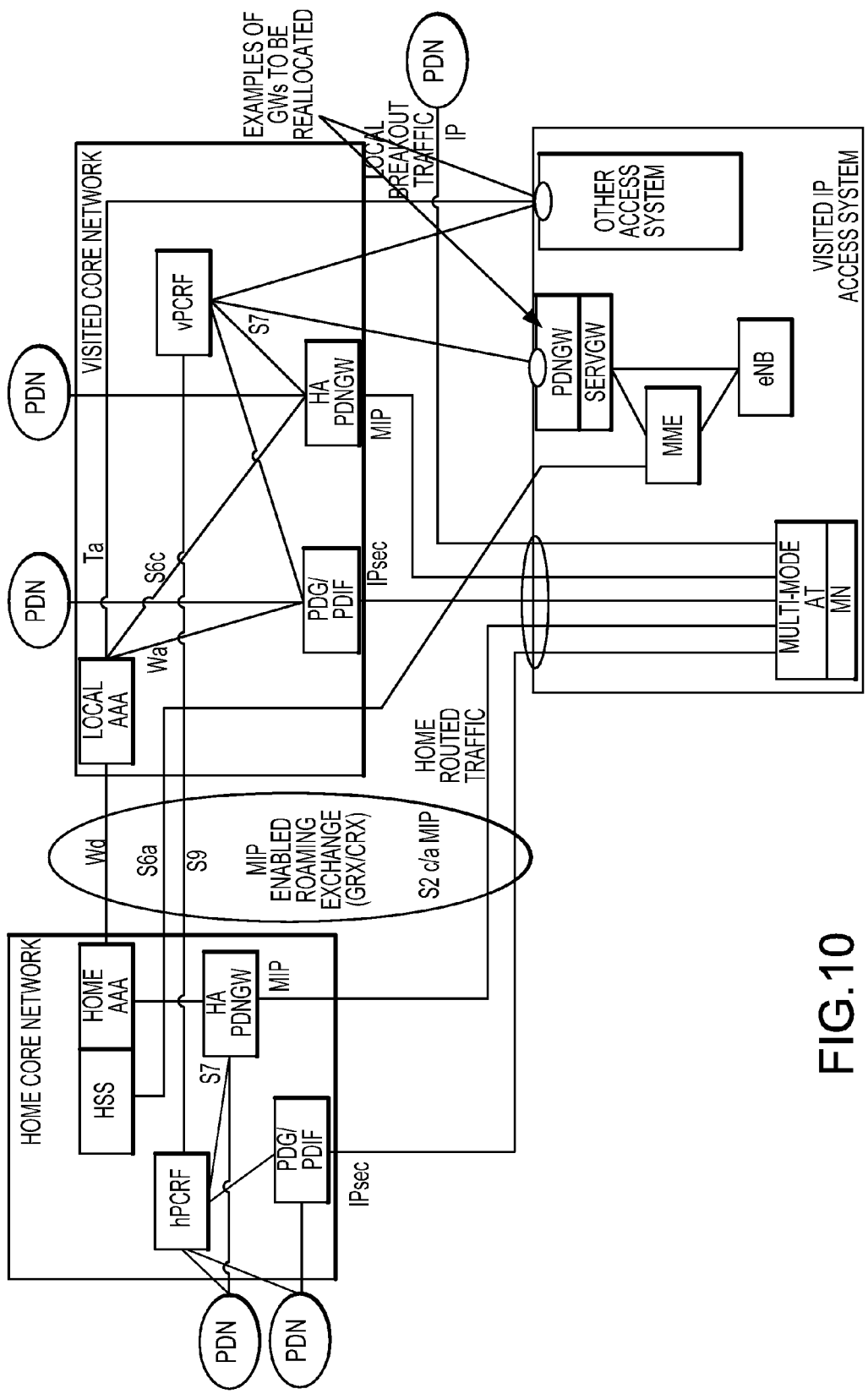
FIG. 10 illustrates a second example of a wireless communication system architecture indicating examples of gateways to be relocated.

FIG. 10 illustrates a second example of a wireless communication system architecture indicating examples of gateways to be relocated. In one aspect, roaming can be towards any trusted IP based access system. In one example, home network authentication can be based on either a) general AAA authentication by Home Network or b) Visited Network 3GPP authentication by MME/SGSN. In one aspect, different ways to connect services are possible. All connections are seen as local breakouts from IP access system point of view. In one aspect, different overlays can exist, such as but not limited to, a) no overlay (i.e., local breakout directly from IP access system), b) IPsec overlay (i.e., anchor at visited or home nw ePDG/PDIF), or c) mobile IP overlay (i.e., anchor at visited or home nw HA/PDNGW).

Figure 11:
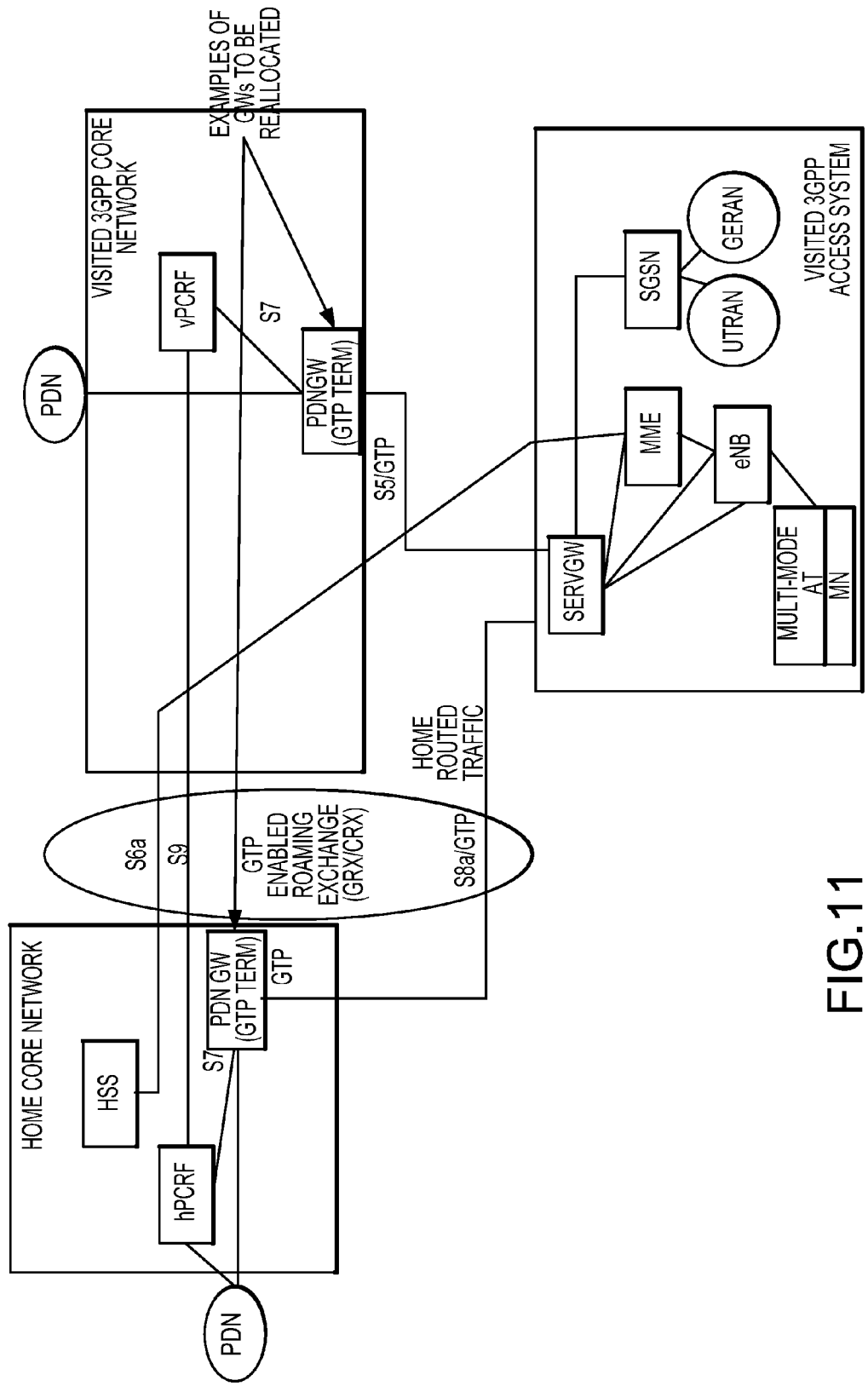
FIG. 11 illustrates a third example of a wireless communication system architecture indicating examples of gateways to be relocated.

FIG. 11 illustrates a third example of a wireless communication system architecture indicating examples of gateways to be relocated. In one aspect, GTP (GPRS Tunneling Protocol) based roaming is between a 3GPP based Core Network and 3GPP access networks. FIG. 11 shows possible types of GTP based connections including GTP based connection to home network and to visited network, GTP tunneling, etc. In one aspect, vPCRF is required and S9 inter PLMN (Public Land Mobile Network) interface is required only for visited network anchored GTP connection. In one aspect, MME/SGSN in visited network and S6a inter PLMN interface are required for any 3 GPP access, regardless of GTP termination. One skilled in the art would understand the wireless communication system architectures illustrated are examples and that other examples of wireless communication system architecture are possible without affecting the spirit or scope of the disclosure.

Figure 12:
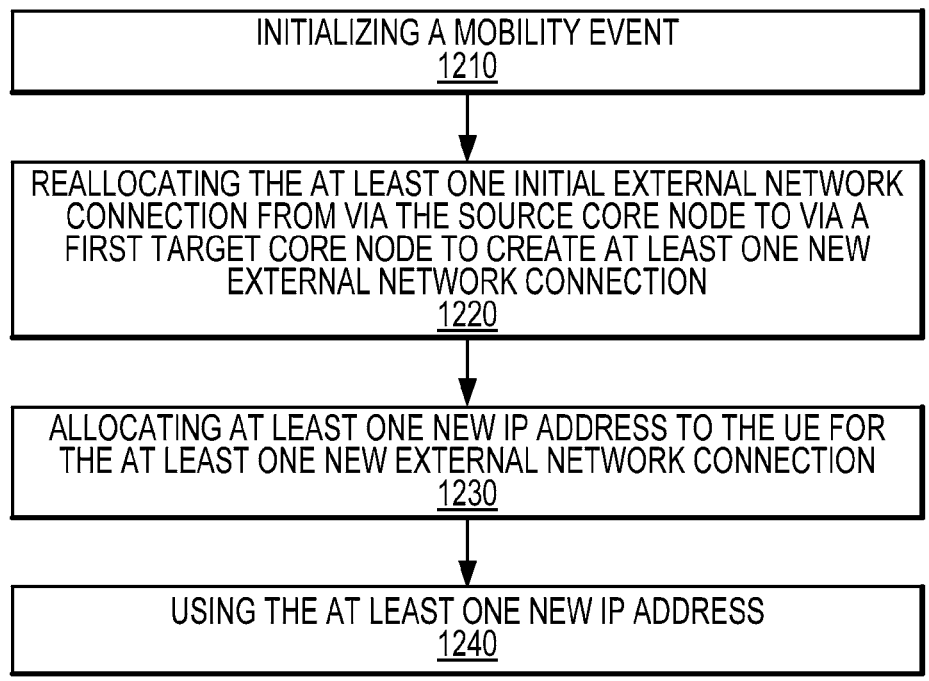
FIG. 12 is an example flow diagram for providing gateway relocation to an external network wherein a UE includes at least one initial external network connection via a source core node.

FIG. 12 is an example flow diagram for providing gateway relocation to an external network wherein a UE includes at least one initial external network connection via a source core node. In block 1210, start by initializing a mobility event Once the mobility event is initialized, reallocating the at least one initial external network connection from via the source core node to via a first target core node to create at least one new external network connection is next in block 1220. In block 1230, allocating at least one new IP address to the UE for the at least one new external network connection is done. And, in block 1240, the at least one new IP address is used.

Figure 13:
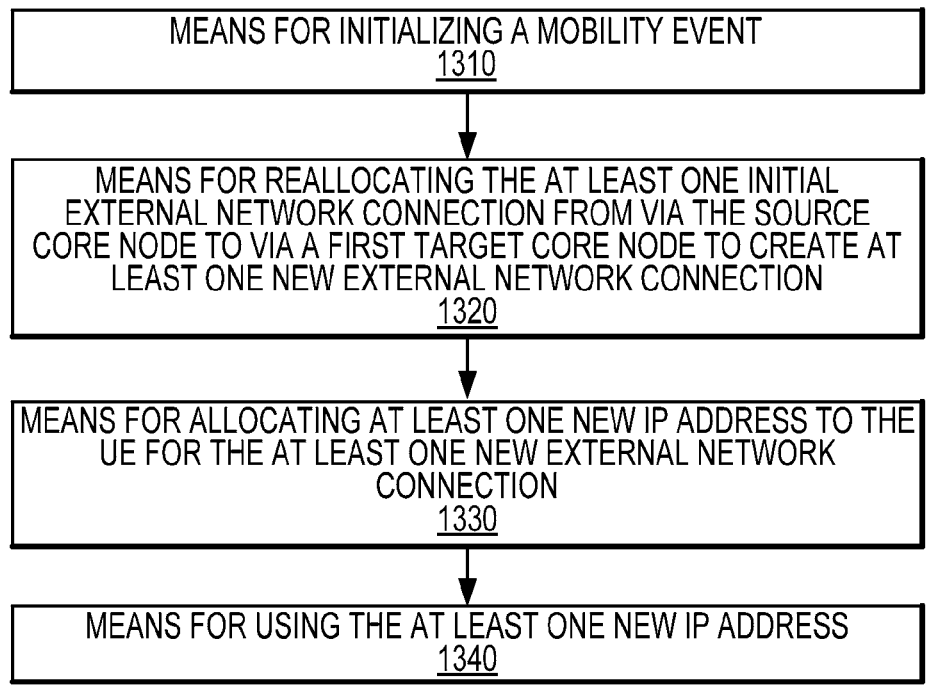
FIG. 13 shows a device 1300 suitable for providing gateway relocation to an external network wherein a UE includes at least one initial external network connection via a source core node.

FIG. 13 shows a device 1300 suitable for providing gateway relocation to an external network wherein a UE includes at least one initial external network connection via a source core node. In one aspect, the device 1300 is implemented by at least one processor comprising one or more modules configured to provide different aspects of gateway relocation as described herein in blocks 1310, 1320, 1330 and 1340. For example, each module comprises hardware, software, or any combination thereof. In one aspect, the device 1300 is also implemented by at least one memory in communication with the at least one processor.

Figure 14:
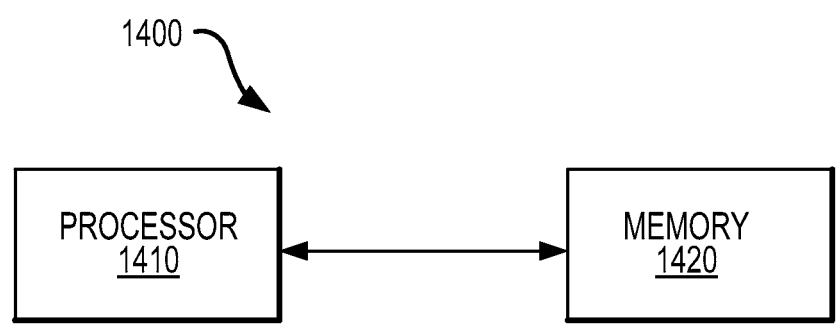
FIG. 14 shows a device comprising a processor and a memory for executing a gateway relocation procedure.

FIG. 14 shows a device 1400 comprising a processor 1410 and a memory 1420 for executing a gateway relocation procedure. In one aspect, the device 1400 executes the flow diagram illustrated in FIG. 12. In one aspect, the device 1400 comprises more than one processor and/or more than one memory.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for providing gateway relocation to an external network wherein a user equipment includes at least one initial external network connection via a source core node, comprising:

initializing a mobility event, wherein initializing the mobility event comprises initiating a gateway relocation upon detecting the at least one initial external network connection to the external network via the source core node;

reallocating the at least one initial external network connection with the external network from the source core node to a first target core node to create at least one new external network connection with the external network, where the first target core node is a packet data network gateway; and registering at least one Internet protocol address for the user equipment for access to the external network via the at least one new external network connection, wherein the at least one Internet protocol address is associated with a moving local breakout packet data network connection.

2. The method of claim 1 wherein the external network is a packet data network.

3. The method of claim 2 wherein one of the at least one initial external network connection or one of the at least one new external network connection is a packet data network connection.

4. The method of claim 1 wherein the gateway relocation is executed in a 3rd Generation Partnership Project system.

5. The method of claim 1 wherein the gateway relocation is partially executed in a 3rd Generation Partnership Project system and partially executed in a 3rd Generation Partnership Project 2 high-rate packet data system.

6. The method of claim 1 wherein the mobility event is a hard handover combined with the gateway relocation.

7. The method of claim 6 wherein the first target core node allocates the at least one Internet protocol address after completion of the hard handover.

8. The method of claim 1 wherein the source core node is a serving gateway.

9. The method of claim 1 wherein the source core node and the first target core node are packet data network gateways.

10. The method of claim 1 wherein the source core node and the first target core node are co-located.

11. The method of claim 1 further comprising registering at least one new Internet protocol address.

12. The method of claim 11 wherein the at least one Internet protocol address is registered with a core node.

13. The method of claim 12 wherein the core node is a home agent.

14. The method of claim 13 wherein the at least one Internet protocol address is registered to its home agent with a Mobile Internet protocol.

15. The method of claim 12 wherein the core node is a packet data network gateway.

16. The method of claim 1 wherein a radio resource management signaling is used to allocate the at least one Internet protocol address.

17. The method of claim 1 further comprising using an identifier to identify the first target core node.

18. The method of claim 17 wherein the identifier is one of an access point name or a network access identifier.

19. The method of claim 1 wherein the first target core node is one of gateway general packet radio service support node, packet data serving node, connectivity service gateway, packet data interworking function/packet data gateway or packet data network gateway.

20. The method of claim 1 wherein a layer 2 signaling is used for allocating the at least one Internet protocol address.

21. The method of claim 1 wherein a IP layer signaling is used for allocating the at least one Internet protocol address.

22. The method of claim 1 further comprising a second target core node contacting the first target core node to request bearer activation.

23. The method of claim 22 further comprising sending a create-bearer request to the first target core node.

24. The method of claim 23 further comprising the first target core node requesting authorization for a bearer.

25. The method of claim 24 further comprising the first target core node sending a bearer activation request to the second target core node.

26. The method of claim 25 further comprising the second target core node sending a bearer activation response to the first target core node to acknowledge activation of the bearer.

27. The method of claim 26 further comprising sending a binding update to a home agent when registering Internet protocol address to the home agent.

28. The method of claim 27 further comprising the home agent responding to the binding update by sending a binding update acknowledgement.

29. The method of claim 28 wherein the binding update acknowledgement is sent to more than one local breakout address.

30. The method of claim 29 wherein the first target core node is packet data network gateway and the second target core node is a serving gateway.

31. An apparatus for providing gateway relocation to an external network wherein a user equipment includes at least one initial external network connection via a source core node, the apparatus comprising at least one processor and at least one memory, the at least one memory containing program code executable by the at least one processor for performing the following:

initializing a mobility event, wherein initializing the mobility event comprises initiating a gateway relocation upon detecting the at least one initial external network connection to the external network via the source core node;

reallocating the at least one initial external network connection with the external network from the source core node to a first target core node to create at least one new external network connection with the external network, where the first target core node is a packet data network gateway; and registering at least one Internet protocol address for the user equipment for the at least one new external network connection, wherein the at least one Internet protocol address is associated with a moving local breakout packet data network connection.

32. The apparatus of claim 31 wherein the external network is a packet data network.

33. The apparatus of claim 32 wherein one of the at least one initial external network connection or one of the at least one new external network connection is a packet data network connection.

34. The apparatus of claim 31 wherein the gateway relocation is executed in a 3rd Generation Partnership Project system.

35. The apparatus of claim 31 wherein the gateway relocation is partially executed in a 3rd Generation Partnership Project system and partially executed in a 3rd Generation Partnership Project 2 high-rate packet data system.

36. The apparatus of claim 31 wherein the mobility event is a hard handover combined with the gateway relocation.

37. The apparatus of claim 36 wherein the first target core node allocates the at least one Internet protocol address after completion of the hard handover.

38. The apparatus of claim 31 wherein the source core node is a serving gateway.

39. The apparatus of claim 31 wherein the source core node and the first target core node are packet data network gateways.

40. The apparatus of claim 31 wherein the source core node and the first target core node are co-located.

41. The apparatus of claim 31 wherein the at least one memory further comprises program code for registering at least one new Internet protocol address.

42. The apparatus of claim 41 wherein the at least one Internet protocol address is registered with a core node.

43. The apparatus of claim 42 wherein the core node is a home agent.

44. The apparatus of claim 43 wherein the at least one Internet protocol address is registered to its home agent with a Mobile Internet protocol.

45. The apparatus of claim 42 wherein the core node is a packet data network gateway.

46. The apparatus of claim 31 wherein a radio resource management signaling is used to allocate the at least one Internet protocol address.

47. The apparatus of claim 31 wherein the at least one memory further comprises program code for using an identifier to identify the first target core node.

48. The apparatus of claim 47 wherein the identifier is one of an access point name or a network access identifier.

49. The apparatus of claim 31 wherein the first target core node is one of gateway general packet radio service support node, packet data serving node, connectivity service gateway, packet data interworking function/packet data gateway or packet data network gateway.

50. The apparatus of claim 31 wherein a layer 2 signaling is used for allocating the at least one Internet protocol address.

51. The apparatus of claim 31 wherein a Internet protocol layer signaling is used for allocating the at least one Internet protocol address.

52. The apparatus of claim 31 wherein the at least one memory further comprises program code for a second target core node to contact the first target core node to request bearer activation.

53. The apparatus of claim 52 wherein the at least one memory further comprises program code for sending a create-bearer request to the first target core node.

54. The apparatus of claim 53 wherein the at least one memory further comprises program code for the first target core node to request authorization for a bearer.

55. The apparatus of claim 54 wherein the at least one memory further comprises program code for the first target core node to send a bearer activation request to the second target core node.

56. The apparatus of claim 55 wherein the at least one memory further comprises program code for the second target core node to send a bearer activation response to the first target core node to acknowledge activation of the bearer.

57. The apparatus of claim 56 wherein the at least one memory further comprises program code for sending a binding update to a home agent when registering the Internet protocol address to the home agent.

58. The apparatus of claim 57 wherein the at least one memory further comprises program code for the home agent to respond to the binding update by sending a binding update acknowledgement.

59. The apparatus of claim 58 wherein the binding update acknowledgement is sent to more than one local breakout address.

60. The apparatus of claim 59 wherein the first target core node is packet data network gateway and the second target core node is a serving gateway.

61. A apparatus for providing gateway relocation to an external network wherein a user equipment includes at least one initial external network connection via a source core node, comprising:
   means for initializing a mobility event, wherein initializing the mobility event comprises initiating a gateway relocation upon detecting the at least one initial external network connection to the external network via the source core node;
   means for reallocating the at least one initial external network connection with the external network from the source core node to a first target core node to create at least one new external network connection with the external network, where the first target core node is a packet data network gateway; and
   means for registering at least one Internet protocol address for the user equipment for access to the external network via the at least one new external network connection, wherein the at least one Internet protocol address is associated with a moving local breakout packet data network connection.

62. The apparatus of claim 61 wherein the external network is a packet data network.

63. The apparatus of claim 62 wherein one of the at least one initial external network connection or one of the at least one new external network connection is a packet data network connection.

64. The apparatus of claim 51 wherein the gateway relocation is executed in a 3rd Generation Partnership Project system.

65. The apparatus of claim 61 wherein the gateway relocation is partially executed in a 3rd Generation Partnership Project system and partially executed in a 3rd Generation Partnership Project 2 high-rate packet data system.

66. The apparatus of claim 61 wherein the mobility event is a hard handover combined with the gateway relocation.

67. The apparatus of claim 66 wherein the first target core node allocates the at least one Internet protocol address after completion of the hard handover.

68. The apparatus of claim 61 wherein the source core node is a serving gateway.

69. The apparatus of claim 61 wherein the source core node and the first target core node are packet data network gateways.

70. The apparatus of claim 61 wherein the source core node and the first target core node are co-located.

71. The apparatus of claim 61 further comprising means for registering at least one new Internet protocol address.

72. The apparatus of claim 71 wherein the at least one Internet protocol address is registered with a core node.

73. The apparatus of claim 72 wherein the core node is a home agent.

74. The apparatus of claim 73 wherein the at least one Internet protocol address is registered to its home agent with a Mobile Internet protocol.

75. The apparatus of claim 72 wherein the core node is a packet data network gateway.

76. The apparatus of claim 61 wherein a radio resource management signaling is used to allocate the at least one Internet protocol address.

77. The apparatus of claim 61 further comprising means for using an identifier to identify the first target core node.

78. The apparatus of claim 77 wherein the identifier is one of an access point name or a network access identifier.

79. A non-transitory computer-readable medium for providing gateway relocation to an external network wherein a user equipment includes at least one initial external network connection via a source core node, the computer-readable medium including program code thereon, which when executed by at least one computer implement a method comprising:
   program code for initializing a mobility event, wherein initializing the mobility event comprises initiating a gateway relocation upon detecting the at least one initial external network connection to the external network via the source core node;
   program code for reallocating the at least one initial external network connection with the external network from the source core node to a first target core node to create at least one new external network connection with the external network, where the first target core node is a packet data network gateway; and program code for registering at least one Internet protocol address for the user equipment for access to the external network via the at least one new external network connection, wherein the at least one Internet protocol address is associated with a moving local breakout packet data network connection.

80. The computer-readable medium of claim 79 wherein the external network is a packet data network.

81. The computer-readable medium of claim 80 wherein one of the at least one initial external network connection or one of the at least one new external network connection is a packet data network connection.

82. The computer-readable medium of claim 79 wherein the gateway relocation is executed in a 3rd Generation Partnership Project system.

83. The computer-readable medium of claim 79 wherein the gateway relocation is partially executed in a 3rd Generation Partnership Project system and partially executed in a 3rd Generation Partnership Project 2 high-rate packet data system.

84. The computer-readable medium of claim 79 wherein the mobility event is a hard handover combined with the gateway relocation.

85. The computer-readable medium of claim 84 wherein the first target core node allocates the at least one Internet protocol address after completion of the hard handover.

86. The computer-readable medium of claim 79 wherein the source core node is a serving gateway.

87. The computer-readable medium of claim 79 wherein the source core node and the first target core node are packet data network gateways.

88. The computer-readable medium of claim 79 wherein the source core node and the first target core node are co-located.

89. The computer-readable medium of claim 79 further comprising program code for registering at least one new Internet protocol address.

90. The computer-readable medium of claim 89 wherein the at least one Internet protocol address is registered with a core node.

91. The computer-readable medium of claim 90 wherein the core node is a home agent.

92. The computer-readable medium of claim 91 wherein the at least one Internet protocol address is registered to its home agent with a Mobile Internet protocol.

93. The computer-readable medium of claim 90 wherein the core node is a packet data network gateway.

94. The computer-readable medium of claim 79 wherein a radio resource management signaling is used to allocate the at least one Internet protocol address.

95. The computer-readable medium of claim 79 further comprising program code for using an identifier to identify the first target core node.

96. The computer-readable medium of claim 95 wherein the identifier is one of an access point name or a network access identifier.

97. The method of claim 1 wherein the source edge node contacts the source intermediate node to initiate the gateway relocation in response to a decision by the source edge node to hand over the user equipment to a target edge node.

98. The method of claim 97 wherein the source edge node is a source base station.

99. The method of claim 98 wherein the target edge node is a target base station.

100. The method of claim 98 wherein the source intermediate node is a mobile management entity.

101. The method of claim 98 wherein the mobility event comprises handover of the user equipment from the source edge node to the target edge node.

102. The method of claim 101 wherein the target core node allocates the at least one Internet protocol address after completion of the handover.

103. The method of claim 1 wherein the source edge node contacting the source intermediate node comprises the source edge node sending a relocation required message to the source intermediate node.

104. The method of claim 103 further comprising means for sending a forward relocation request message from the source intermediate node to a target intermediate node.

105. The method of claim 104 wherein the source intermediate node is a mobile management entity and the forward relocation request message includes a user equipment context in the mobile management entity.

106. The method of claim 104 further comprising means for sending a create bearer request message from the target intermediate node to a second target core node.

107. The method of claim 106 further comprising means for contacting the first target core node from the second target core node to request bearer activation.

* * * * *